United States Patent
Zemlyak et al.

(10) Patent No.: US 6,625,572 B1
(45) Date of Patent: Sep. 23, 2003

(54) CYCLE MODELING IN CYCLE ACCURATE SOFTWARE SIMULATORS OF HARDWARE MODULES FOR SOFTWARE/SOFTWARE CROSS-SIMULATION AND HARDWARE/SOFTWARE CO-SIMULATION

(75) Inventors: Boris Zemlyak, Cupertino, CA (US); Ronen Perets, Cupertino, CA (US); Brian F. Schoner, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/470,362

(22) Filed: Dec. 22, 1999

(51) Int. Cl.[7] .............................................. G06F 11/267
(52) U.S. Cl. ............................ 703/19; 703/14; 703/20; 703/21; 703/22; 703/23; 703/24; 703/25
(58) Field of Search ........................... 703/22, 14, 20, 703/21, 25, 23, 19

(56) References Cited

U.S. PATENT DOCUMENTS

| | | | |
|---|---|---|---|
| 5,842,005 A | * 11/1998 | Walsh et al. | 713/500 |
| 5,845,060 A | * 12/1998 | Vrba et al. | 375/356 |
| 5,920,712 A | * 7/1999 | Kuijsten | 703/23 |

OTHER PUBLICATIONS

Sanjiv Narayan, Daniel D. Gajski, "System clock estimation based on clock slack minimization," Proceedings of the conference on European Design Automation Nov. 1992, pp. 66–71.*

Brian Schoner, John Villasenor, Steve Molloy, Rajeev Jain, "Techniques for FPGA implementation of video compression systems," Proceedings of the third international ACM symposium on Field–programmable gate arrays, Feb. 1995, pp. 154–159.*

* cited by examiner

*Primary Examiner*—Samuel Broda
*Assistant Examiner*—Samarina Makhdoom
(74) *Attorney, Agent, or Firm*—Christopher P. Maiorana, PC

(57) ABSTRACT

Clock cycle simulation involves modeling of clock cycles in a hardware module with a software model. Each simulated clock cycle involves several individual stages: Start, Execute, and End. During the start stage, output pin values for the model are calculated from an initial state of the module being simulated. Between the start stage and the execution stage, a combinatorial function of the modules outputs can be calculated. These calculated functions may be used as inputs to the modules in the execution stage. Afterwards, during the execute stage, input pin values are received by the model and the next state of the module is calculated based upon the current module state and the input pin values. Finally, during the last stage, i.e., the end stage, the internal state is updated; the internal state is defined as a set of the module's internal register and memory values.

11 Claims, 5 Drawing Sheets

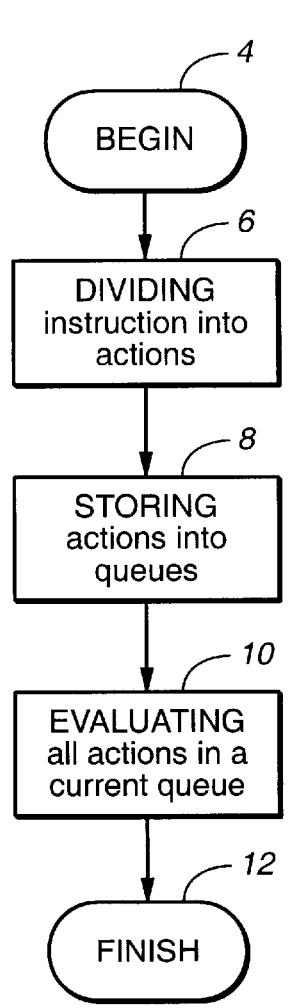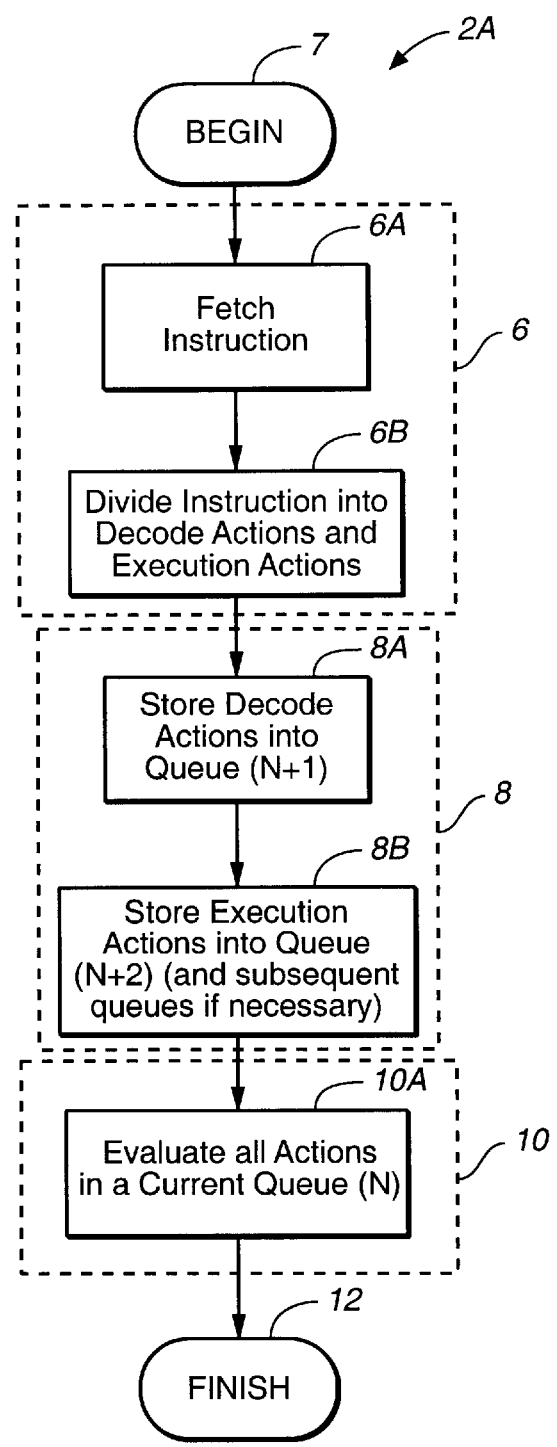

| Cycle:   | N-1 (non existing) | N Current Cycle | N+1   | N+2  |
|----------|--------------------|-----------------|-------|------|
| Execute: | E(X-3)             | E(X-2)          | E(X-1)|      |
| Decode:  | D(X-2)             | D(X-1)          |       |      |

▨ non existing

*FIG._3*

| Cycle:   | N-1 (non existing) | N Current Cycle | N+1   | N+2  |
|----------|--------------------|-----------------|-------|------|
| Execute: | E(X-3)             | E(X-2)          | E(X-1)| E(X) |
| Decode:  | D(X-2)             | D(X-1)          | D(X)  |      |

▨ non existing

*FIG._4*

| Cycle:   | N-1 (non existing) | N (non existing) | N+1 Current Cycle | N+1  |
|----------|--------------------|------------------|-------------------|------|
| Execute: | E(X-3)             | E(X-2)           | E(X-1)            | E(X) |
| Decode:  | D(X-2)             | D(X-1)           | D(X)              |      |

▨ non existing

*FIG._5*

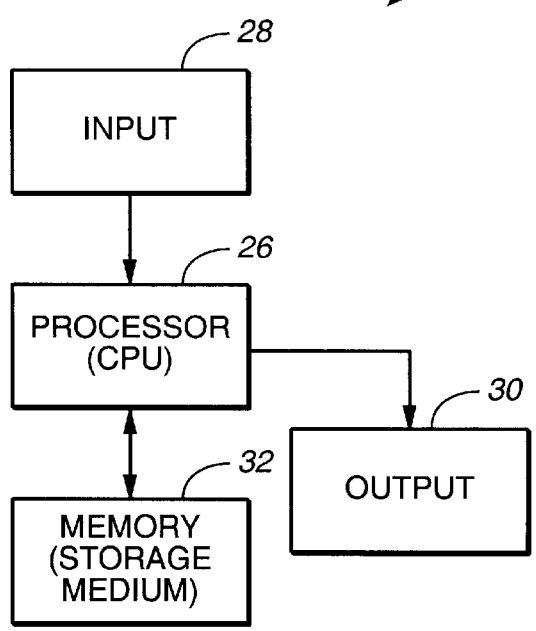
FIG._6
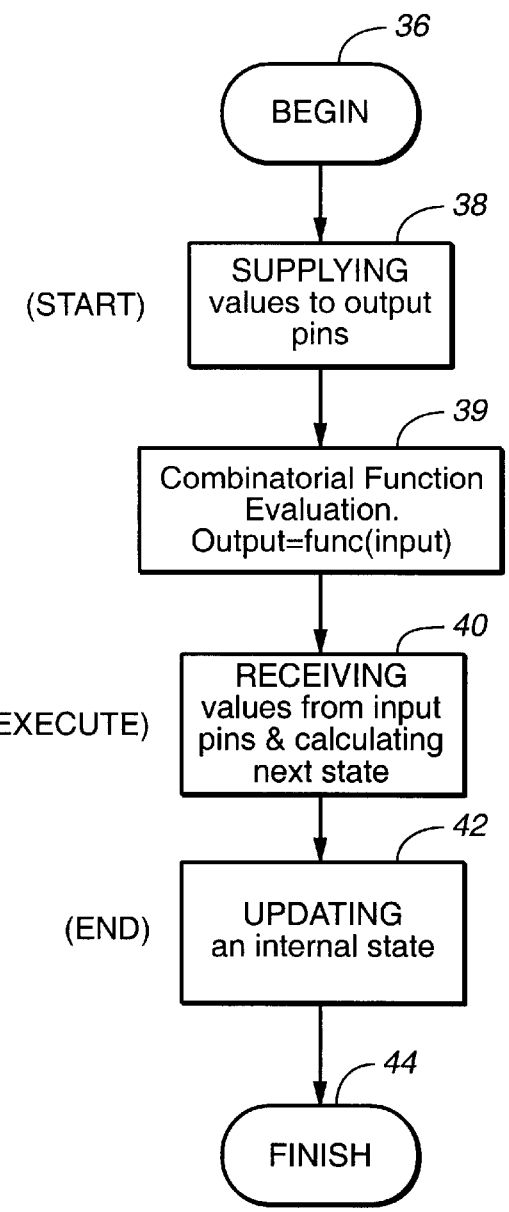
FIG._7

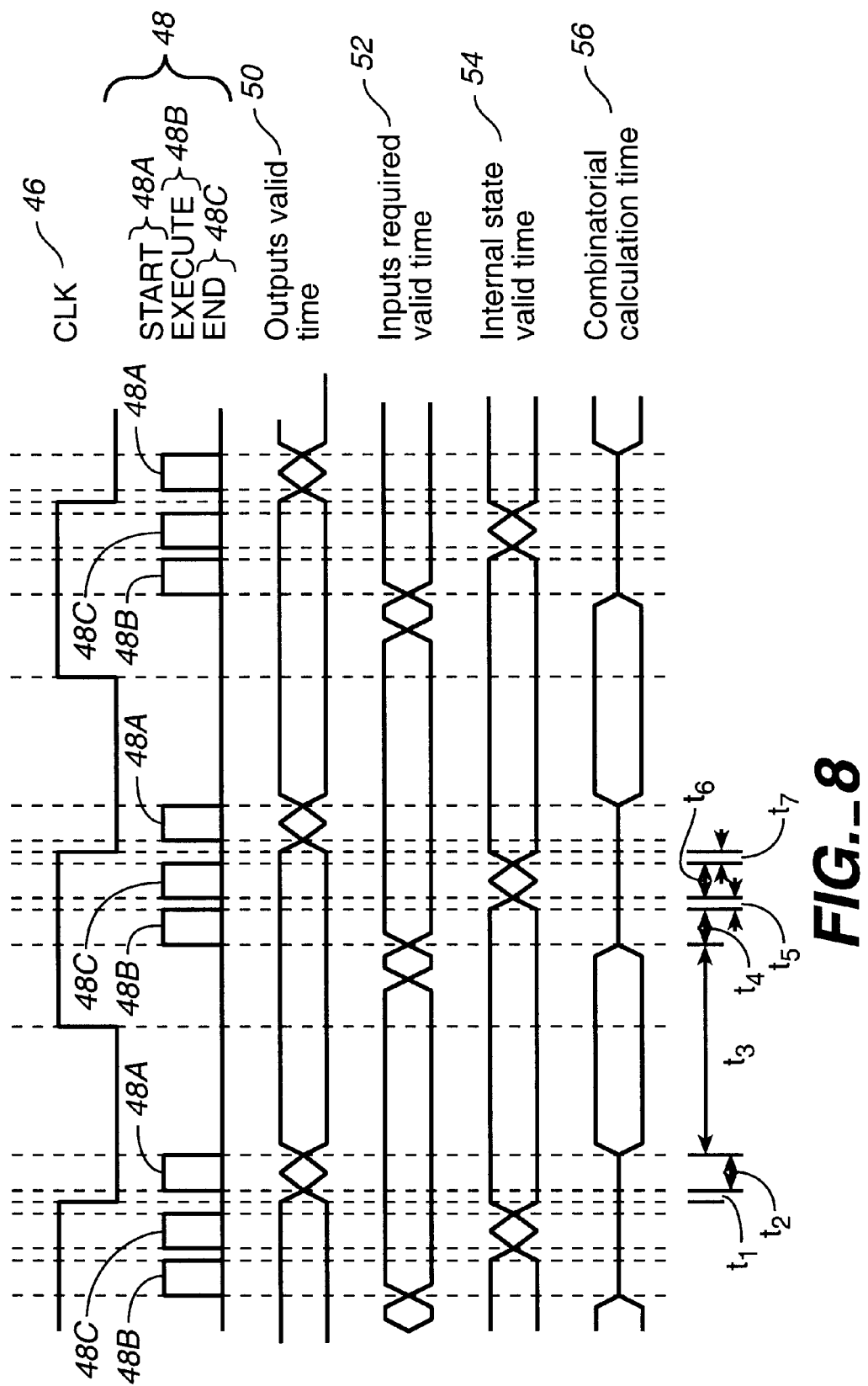
FIG._8

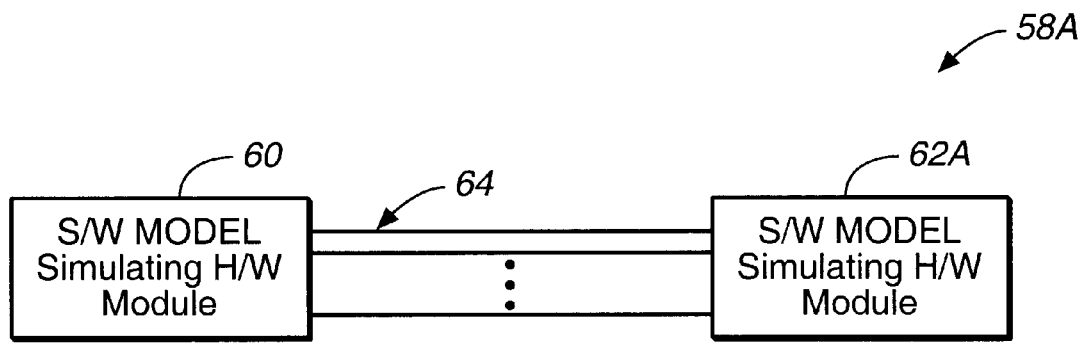
FIG._9A
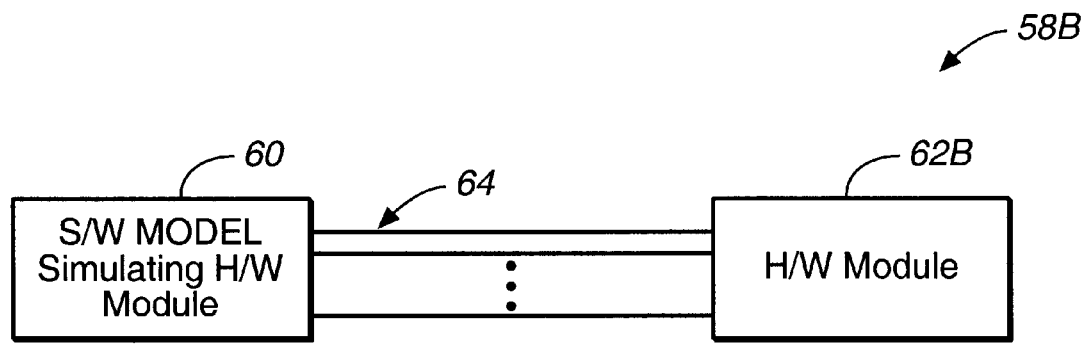
FIG._9B

CYCLE MODELING IN CYCLE ACCURATE SOFTWARE SIMULATORS OF HARDWARE MODULES FOR SOFTWARE/SOFTWARE CROSS-SIMULATION AND HARDWARE/SOFTWARE CO-SIMULATION

APPENDIX

Microfiche Appendix A, which is part of the present disclosure, is an appendix consisting 4 sheets of microfiche having 195 frames. Microfiche Appendix A lists source code of a computer program and related data of an illustrative embodiment of the present invention for use in an industry standard Sun Solaris Machine™. Appendices B and C which are part of the present disclosure, are a pseudo code listing and a Verilog listing, respectively.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Invention

This invention relates to pipeline and cycle modeling for software simulation techniques of hardware modules and software-software cross-simulation and software-hardware co-simulations of hardware modules.

2. Description of Related Art

Software simulation of electronic components and systems has become an important tool for designers. Simulation of a design is the execution of an algorithm that models the behavior of the actual design. Simulation provides the ability to analyze and verify a design without actually constructing the design and has many benefits in the design process. Simulation techniques have also been used for a variety of applications including simulation of digital signal processors (DSPs). Such simulations have included pipeline modeling as well as clock cycle modeling. However, such simulations are limited in many ways.

In the case of pipeline modeling for processors, conventional simulations either did not model the pipelines or a backward history method was employed. In a conventional simulation that did not model the pipelines, every instruction was considered to be executed during one instruction cycle, i.e., every instruction was fetched, decoded, and executed during a single cycle. However, because a pipelined processor does not fetch, decode, and execute each instruction during one instruction cycle, this method is not cycle accurate.

Using the backward history method, the pipeline state was stored in a memory for a predetermined number of cycles backwards, i.e., a number of previously executed states were stored for use in decision making during a current cycle. This was an extremely cumbersome and complicated method which requires decision tree evaluations to decide what should be executed during the current cycle.

In the case of simulation of hardware modules, many multi-stage software techniques have existed for modeling of clock cycles within the hardware; however, those techniques have been limited in the accuracy of clock cycle correlation between different modules and/or simulations.

Testing and verification of hardware modules and microprocessors have been performed with software simulation modules in place of the actual hardware. Unfortunately, it is difficult for clock cycle modeling to support simultaneous cycle accurate hardware modeling, software/hardware co-simulation, and software/software cross-simulation.

SUMMARY

In accordance with the invention, a method of modeling a processor with software is described. One aspect of modeling involves simulating a processor pipeline which has a plurality of stages, e.g., a three-stage pipeline. This involves fetching an instruction, which is then subdivided into several individual actions. These actions include a decode action and an execution action. Upon subdividing the instruction, these actions are then stored in various queues. For instance, for a current cycle, N, a decode action could be inserted into the following queue for cycle, N+1, and an execution action could be inserted into the next following queue for cycle, N+2. Once these actions are inserted into their respective queues, the current cycle is evaluated and the results stored. It should beunderstood that there may be more than one action or no actions per each storage.

This method of pipeline modeling can be applied to any multi-stage pipeline with any number of stages and provides a way of processing forward-looking queues without having to utilize decisions or decision tree evaluations.

Aside from pipeline modeling, another aspect of processor modeling is clock cycle simulation. Clock cycle simulation involves modeling of clock cycles in a hardware module with a software model. Each simulated clock cycle involves several individual stages: Start, Execute, and End. During the start stage, output pin values for the module are calculated from a state of the module being simulated. A combinatorial function of module outputs can be calculated between start and execution stages. These calculated functions may be used as inputs to the modules in execution stage. Afterwards, during the execute stage, input pin values are received by the model and the next module state is calculated based upon the current module state and the input pin values. Finally, during the last stage, i.e., the end stage, the internal module state is updated; the internal module state is defined as a set of the module's internal register and memory values.

This method of separating stages into a start, execute, and end stage enables not only software simulation of hardware modules with cycle accuracy, but also software-to-software cross-simulation between software models. Also, software-to-hardware co-simulation between a software model and a hardware module is possible because of the accuracy of the cycle modeling between actual modules and simulated modules.

Both the pipeline modeling and the clock cycle modeling used together represent a complete and efficient platform for development of software simulators of hardware modules. They also represent an efficient method of simulation which is able to be implemented in a wide variety of designs and in a wide variety of computer languages.

BRIEF DESCRIPTION OF THE DRAWINGS

FIG. 1 shows a flow diagram illustrating the processes of forward prediction in pipeline modeling.

FIG. 2 shows the flow diagram of FIG. 1 with detailed processes.

FIG. 3 shows a queue insertion operation for current cycle N.

FIG. 4 shows a queue insertion operation for current cycle N as a time progression from FIG. 3.

FIG. 5 shows a queue insertion operation for current cycle N+1 as a time progression from FIGS. 3 and 4.

FIG. 6 shows a schematic of a computer having a computer-readable storage medium upon which software may be stored.

FIG. 7 shows a flow diagram illustrating the processes of clock cycle modeling.

FIG. 8 shows a timing diagram illustrating the relationships between a clock cycle and the subdivided cycles.

FIG. 9A shows cross-simulation between two software models.

FIG. 9B shows co-simulation between a software model and a hardware module.

Use of the same reference symbols in different figures indicates similar or identical items.

DETAILED DESCRIPTION

Simulating a processor with software is a cycle-by-cycle evaluation of the processor state. A processor state is defined as the states, or values, of internal registers and memories after the execution of a cycle. Each instruction acts to modify the processor state when it is inside a pipeline. A conventional processor pipeline is typically known by one of ordinary skill in the computer arts. Each instruction is also further subdivided into separate actions according to the pipeline stages, the instruction passes and the instruction type.

For three stage pipelines, an instruction will be subdivided into at least two stages, decoding and execution. In other situations and embodiments, different types of instructions will necessitate multiple stages. An example of a subdivided instruction for a three-stage pipeline is shown for the instruction "mov r0, r1", which is divided into the following actions:

Decode: do nothing

Execute: read value from register r0 and write this value to register r1

Some types of instructions may require more than one execution action per pipeline stage. For example, a multiply and accumulate (MAC) instruction, an instruction such as "mul x, y, t || add t, a, a" in a five-stage pipeline requires multiple subdivided stages, and thus is divided into the following actions:

Decode: do nothing

Execute1

Execute1_1: read values from x and y registers

Execute1_2: read values from t and a registers

Execute2

Execute2_1: calculate x*y using the values read during Execute1

Execute2_2: calculate t+a using the values read during Execute1

Execute3

Execute3_1: write back calculated during Execute2 value to the t register

Execute3_2: write back calculated during Execute2 value to the a register

Thus, the number and the kind of actions to be performed is determined by the instructions.

FIG. 1 shows flow diagram 2 which illustrates the processes of forward prediction in pipeline modeling in accordance with an embodiment of the present invention. The particular embodiment relates to a three-stage pipeline. It should be understood, however, that this technique can be used for modeling any other multi-stage pipelines. Upon beginning the process as described in this embodiment, the process includes dividing an instruction into sub-instructions, or actions, as shown in step 6. Upon dividing the instruction, these actions are then stored into several appropriate queues in step 8. Finally, upon storing the separate actions into the different queues, in step 10 the current cycle evaluates all actions that are stored in a current queue. Upon completion of the evaluation, the execution of this cycle finishes 12 and is ready to complete a next cycle using the same process.

FIG. 2 shows a more detailed process of that shown in FIG. 1 and is similarly numbered. As seen in flow diagram 2A, the beginning 4 of a cycle, N, is followed by the dividing step 6, which is further divided into several processes. As shown, an instruction is initially fetched in step 6A. Upon fetching, the instruction is then divided into sub-instructions, or actions. The instructions are fixed and known when first fetched and are subdivided into decode and execution actions, seen in step 6B.

After the instruction is initially fetched and subdivided, the individual actions decode and execution from step 6B are inserted into subsequent queues during the storing process, shown generally in step 8. If the current cycle is considered cycle N, decode action from step 6B is inserted into the queue corresponding to the next cycle N+1, as in step 8A, and execution action from step 6B is inserted into the queue corresponding to two cycles following, i.e., N+2, as indicated in step 8B. Upon inserting the actions into their corresponding queues, the action in the current queue for cycle N is evaluated in step 10A and the resulting values are stored. Finally, the procedure is finished in step 12 and the subsequent queues can be evaluated following the same procedure.

It should be understood that where the pipeline is modified or broken for an external event, e.g., an interrupt, the contents of the queues are modified as well.

FIGS. 3, 4 and 5 show an example of an embodiment of the queue insertion operations as a function of time from left to right beginning with cycle N−1 (block 16) to cycle N+2 (block 22). As indicated in FIGS. 3, 4 and 5, a cycle with cross hatches is no longer existing, i.e., the actions and the queue in that past cycle are erased after the completion of the cycle. Address X is fetched in this embodiment. FIG. 3 shows the progression 14A of a pipeline model in the process before step 6B in FIG. 2. As shown in FIG. 3, the current cycle N (block 18) shows insertion of the decode action D(X−1) in its queue from the previous cycle N−1 (block 16), while the execute action E(X−1) from previous cycle N−1 (block 16) has been inserted into the second following cycle N+1 (block 20).

FIG. 4 shows the progression 14B of the pipeline model from FIG. 3 and represents the process after step 8B in FIG. 2. FIG. 4 is similar in most respects and similarly numbered to FIG. 3. As shown in FIG. 4, the decode action from cycle N (block 18) has been inserted into the queue corresponding to the next cycle N+1 (block 20) as D(X) and execution action from cycle N (block 18) has been inserted into the queue corresponding to the subsequent cycle N+2 (block 22) as E(X). The current cycle, however, is still cycle N (block 18).

FIG. 5 shows the progression 14C of the pipeline model from FIGS. 3 and 4 and represents the process after step 10A in FIG. 2. After the insertions of decode action D(X) and execution action E(X) in respective cycles N+1 (block 20) and N+2 (block 22), the execution action E(X−2) in cycle N (block 18) is evaluated as is the decode action D(X−1). Cycle N (block 18) is complete and the processor states related to the time unit are updated so that cycle N+1 (block 20) becomes the current cycle, as shown in FIG. 5.

When cycle N (block 18) is completed, the actions in that cycle are erased and are no longer existing, as indicated by the cross hatching in FIG. 5.

With the action erasure, no register history or program counter is stored; only a current state is maintained within a register file. Thus, the queue corresponding to a current cycle is the accumulation of work done in previous cycles rather than having a set of stored instructions moved through different cycles and then re-executed and evaluated each time with decision trees. The number of active (non-empty) queues is relatively small and is equal to the number of pipeline stages of the longest instruction plus one.

FIG. 6 shows a schematic diagram of the present invention as incorporated with a computer 24. The computer 24 includes a processor 26, or central processing unit (CPU), which is coupled to an input 28 and an output 30. Input 28 includes such conventional devices such as keyboards or floppy drives, etc. and output 30 includes conventional devices such as monitors, printers, etc. Computer-readable storage medium (memory) 32 stores the encoded software of FIG. 1 and is accessed by processor 26 to carry out the necessary processes. Memory 32 includes conventionally known memory storage devices.

Microfiche Appendix A, which is part of the present disclosure, is an appendix consisting 4 sheets of microfiche having 195 frames. Microfiche Appendix A lists source code of a computer program and related data of an illustrative embodiment of the above described invention in FIGS. 1 through 5 and may be used in a computer such as that shown in FIG. 6, e.g., an industry standard Sun Solaris Machine™.

In accordance with another embodiment of the present invention, cycle simulation of hardware modules begins in one embodiment by modeling hardware modules interfaced with each other with input/output (I/O) pins. Modeling the clock cycle involves subdividing the clock cycle into three stages: Start, Execute, and End.

The following description refers to both FIGS. 7 and 8. As shown in FIG. 7, flow diagram 34 illustrates the individual steps: start, execute, and end. After beginning a cycle in step 36, all the output pin values of the modules are calculated during the start stage in step 38. Start stage involves supplying values to output pins; these values are calculated from an internal state of the simulated module. In step 39, a combinatorial function evaluation is performed if necessary, where the combinatorial functions receive input pin values produced by the modules of step 38 and calculates output values based on these input values. After supplying the output pin values in step 39, the next step 40 is the execute stage. During execute stage 40, input values are received from the input pins and the modules next state is calculated based upon these input pin values and its internal state. The internal state of a module is defined as a set of its internal register and memory values. By splitting the start and execute stages, the model is able to evaluate input pin values to modules as combinatorial functions of output pin values, as performed in step 39. Combinatorial logic refers to situations where values depend completely upon the input values, e.g., the logic involved in outputting a value from an inverter depends only upon the input values put into the inverter.

Referring to FIG. 8, a timing diagram of one embodiment is shown of the relevant states, including module clock signal 46 and individual signals start 48A, execute 48B, and end 48C. Between start 48A and execute 48B, combinatorial calculation time 56 is present.

Upon completion of execute stage 40, referring to FIG. 7, the internal state is updated during the end stage in step 42, and the cycle is finished in step 44. Execute step 40 and end step 42 have been separated to enable multiple simultaneous read/write accesses to the internal module registers. An aspect of this process is described in detail in, U.S. patent application "Modeling A Read/Write Register Having Multiple Read/Write Operations Per Cycle" by Boris Zemlyak, and having Ser. No. 09/469,891, and which is co-filed and commonly owned with the present application and is herein incorporated by reference in its entirety. Additionally, this method of modeling can be used in conjunction with other aspects of simulation, as described in greater detail in the co-pending and co-filed U.S. patent applications entitled "Instruction Caching After Decoding In Software Models Of Processors" by Ronen Perets and Boris Zemlyak, and having Ser. No. 09/469,408; and "Forward Prediction Technique For Pipeline Modeling In Software Simulators Of Processors" by Ronen Perets and Boris Zemlyak, and having Ser. No. 09/471,534. All of these applications are commonly owned with the present application and are herein incorporated by reference.

With the separation of clock cycles into start step 38, execute step 40, and end step 42, different software models of hardware modules can now be cross-simulated. In FIG. 9A, cross-simulation 58A shows software model 60, which is simulating a corresponding hardware module, electronically coupled through input and output pins 64 to software model 62A, which is simulating another corresponding hardware module. This cross-simulation can be done by emulating the pseudo code in Appendix B, which in.this embodiment is for C++ code; however, the simulations can be done in any computer language that one of ordinary skill in the art would know.

As seen in FIG. 9B, which is similar in most respects and similarly numbered to FIG. 9A, co-simulation 58B illustrates the pseudo code of Appendix B for another embodiment for coupling software model to a hardware module. Software model 60 is electronically coupled by input and output pins 64 to hardware module 62B and can be simulated with cycle accuracy.

Appendix C shows an example of Verilog code, which uses the same functions as the pseudo code example of Appendix B. This code is used for each Verilog module coupled with a software model of another module. Microfiche Appendix A, which is part of the present disclosure, is an appendix consisting 4 sheets of microfiche having 195 frames. Microfiche Appendix A lists source code of a computer program and related data of an illustrative embodiment of the above described invention in FIGS. 7, 8, 9A, and 9B and may be used in a computer such as that shown in FIG. 6, e.g., an industry standard Sun Solaris Machine™.

Because of the flexibility presented by separating start 48A, execute 48B, and end 48C stages, as shown in FIG. 8, they can be located anywhere inside the module clock cycle with the only restriction on the relative order: start 48A must precede execute 48B, and end 48C must follow execute 48B. The time periods required by start 48A, execute 48B, and end 48C stages are shown in FIG. 8 as periods t2, t4, and t6, respectively. These time periods t2, t4, t6 are small and the other time periods t1, t3, t5, and t7 can be set arbitrarily to satisfy actual hardware module timing requirements. This arbitrary timing setting enables the hardware/software co-simulation shown in FIG. 9B.

As the present invention can simulate hardware modules, the software for the simulator can be stored on any number of conventionally known computer-readable storage medium (memory). As previously seen in FIG. 6, a schematic diagram of the present invention as incorporated with a computer 24 is shown. The computer 24 includes processor 26 which is coupled to input 28 and output 30. Input 28 includes input devices such as conventional keyboards or floppy drives, etc. and output 30 includes output devices such as conventional monitors, printers, etc. Computer-readable storage medium (memory) 32 stores the encoded software of FIG. 7 and is accessed by processor 26 to carry out the necessary processes. Memory 32 includes conventionally known memory storage devices.

Although the invention has been described with reference to particular embodiments, the description is only an example of the invention's application and should not be taken as a limitation. In particular, even though much of preceding discussion was aimed at software modeling of processor functions, alternative embodiments of this invention include modeling of various other hardware modules and in various programming languages, as well as modeling of multiple hardware and software modules. Various other adaptations and combinations of features of the embodiments disclosed are within the scope of the invention as defined by the following claims.

APPENDIX B

```
HWModuleModelList *model;
SimOutputPins *outputPinsArray[numOfModules];
SimInputPins *inputPinsArray[numOfModules];
int numOfModules;
void cycle(int numOfCycles)
{
    for(int i = 0; i < numOfCycles; i++) {
        //Call start for all modules
        for (int m = 0; m < numOfModules; m++)
            outputPinsArray[m] = model[m] -> start( );
        //Calculate here combinational function of module inputs
        //depending on module outputs
        combinational_logic(outputPinsArray, inputPinsArray);
        //Call execute for all modules
        for (m = 0; m < numOfModules; m++)
            model[m] -> execute(inputPinsArray[m]);
        //Call end for all modules
        for (m = 0; m < numOfModules; m++)
            model[m] -> end( );
    } //for (int i = 0; i < numOfCycles; i++)
}
```

If an input pin "A" of a module "0" is a logical AND of output pin "B" of a module "1" and output pin "C" of a module "2", then the combinational_logic( ) function should contain the following statements:

```
void combinational_logic(SimOutputPins **out, SimInputPins **in)
{
    ...
    in[0] -> A = out[1] ->B & out[2] -> C;
    ...
}
```

APPENDIX C

```
//This code is being performed every time the clock is togging
from low to high.
//First all model registers and inputs are being updated according
to the results of
```

APPENDIX C-continued

```
//the previous cycle. Following that all new register values are being
evaluated
//(execute cycle), and then the registers load their new value
(end_cycle).
//Only then the new outputs are being evaluated and driven to the
output pins
//themselves (start_cycle). Ever since this being performed
every cycle there
//is a continuous execution of: start, execute, end, start, execute, . . .
//All other functions names update_xxx are used for actually
reading a verilog
//pin/register or writing a verilog pin/register, into/from the
software model. As
//such they are only bridging functions between software env. and
Verilog env.
always @(posedge clk) begin
    if(EnableInputs == 1)$update_model_register( );
        //Update the software model registers with new values
        //forced by the user by loading the exposed
        //registers
    if(EnableInputs == 1)$update_inputs( );
        //Read the module inputs and force the software model
        //respective inputs to these values
    $execute( );
        //respective inputs to these values
        //Digest the new inputs and prepare the new
        //values to be loaded into the software model register
    $end cycle( );
        //Load the software model register with their new
        //values as evaluated by $execute( )
    $update_exposed_registers( );
        //Copy the values within the software model register
        //to this module level registers, so
        //they may be exposed for viewing by SignalScan
        //or any other debug tool
    $start_cycle( );
        //Make the software model update all registers and its
        //outputs
    $update_outputs( );
        //Update the outputs of this module to reflect
        //the values of the software model outputs
    EnableInputs == 1;
end
```

We claim:

1. A method of cross-simulating multiple software models of corresponding hardware modules, corresponding:

supplying to first output pin of a first simulated hardware module a first output value during a first stage of a first clock cycle in a first software model;

calculating a combinatorial function of said first output value to generate a second output value;

receiving from an input pin of said first hardware module a first input value and calculating a next state of said first simulated hardware module based on an internal stage of said first simulated hardware module and said first input value first second stage of said first clock cycle in said first software model;

updating the internal stage of said first simulated hardware module during a third stage of said first clock cycle in said first software model;

supplying to a second output pin of a second simulated hardware module a third output value during a first stage of a second clock cycle in a second software model;

calculating a combinatorial function of said third output value to generate a fourth output value;

receiving from an input pin of said second hardware module a second input value and said calculating a next state of said second simulated hardware module based on an internal state of said second simulated hardware module and said second input value during a second stage of said second clock cycle in said second software model, and updating the internal stage of said second simulated hardware module during a third stage of said second clock cycle in said second software model, wherein the second software model is in electronic communications with the first software model.

2. The method of claim 1, wherein said second stage occurs subsequent to said first stage and said third stage occurs subsequent to said second stage.

3. The method of claim 1, wherein said first output value is calculated from an initial state of said first simulated hardware module.

4. The method of claim 1, wherein said third output value is calculated from an initial state of said second simulated hardware module.

5. The method of claim 1, further comprising:

supplying a set of first output values to a plurality of output pins of said first simulated hardware module during said first stage of said first clock cycle; and receiving a set of second input values from a plurality of input pins of said second simulated hardware module during said second stage of said second clock cycle, wherein calculating a next state of said second simulated hardware module is further based on said set of second input values, and said plurality of input pins of said second simulated hardware module is in electronic communications with said plurality of output pins of said first simulated hardware module.

6. The method of claim 5, further comprising:

supplying a set of first output values to a plurality of output pins of said first simulated hardware module during said first stage of said first clock cycle; and receiving a set of first input values from a plurality of input pins of said first simulated hardware module during said second stage of said second clock cycle, wherein calculating a next state of said second simulated hardware module is further based on said set of first input values, and said plurality of input pins of said first simulated hardware module is in electronic communications with said plurality of output pins of said first simulated hardware module.

7. A method of co-simulating a software model simulating a corresponding first hardware module with a second hardware module, comprising:

supplying to an output pin of said simulated first hardware module a first output valve during a first stage of a clock cycle in said software model;

calculating a combinatorial function of said first output value to generate second output value:

receiving from a plurality of input pins of said simulated first hardware module a set of first input values and calculating a next state of said simulated first hardware module based on an internal state of said simulated first hardware module and said set of first input values during a second stage of said clock cycle in said software model;

updating the internal state of said simulated first hardware module during a third stage of said clock cycle in said software model; and supplying to a plurality of output pins of said second hardware module a set of third output values, wherein the plurality of output pins of the second hardware module are in electronic communications with the plurality of input pins of said simulated first hardware module.

8. The method of claim 7, wherein said first output value is calculated from an initial state of said simulated first hardware module.

9. A computer-readable storage medium encoded with software, wherein said software models clock cycles in a simulated hardware module, each clock cycle comprising a plurality of stages, said computer-readable storage medium performing the method of:

supplying to a set of output pins of said simulated hardware module a set of first output values during a first stage of said clock cycle;

calculating a combinatorial function on some or all of said set of first output values to generate a second output value;

receiving from a plurality of input pins of said simulated hardware module a set of first input values and calculating a next state of said simulated hardware module bated on an internal state of said simulated hardware module and said set of first input values during a second stage of said clock cycle; and updating the internal state of said simulated first hardware module during a third stage of said clock cycle.

10. The method of claim 9, wherein said first output value is calculated from an initial state of the simulated first hardware module.

11. The method of claim 9, wherein said second stage occurs subsequent to said first stage and said third stage occurs subsequent to said second stage.

* * * * *